Oct. 27, 1936.     G. G. SIMPSON     2,058,640
PLOW
Filed Feb. 19, 1936
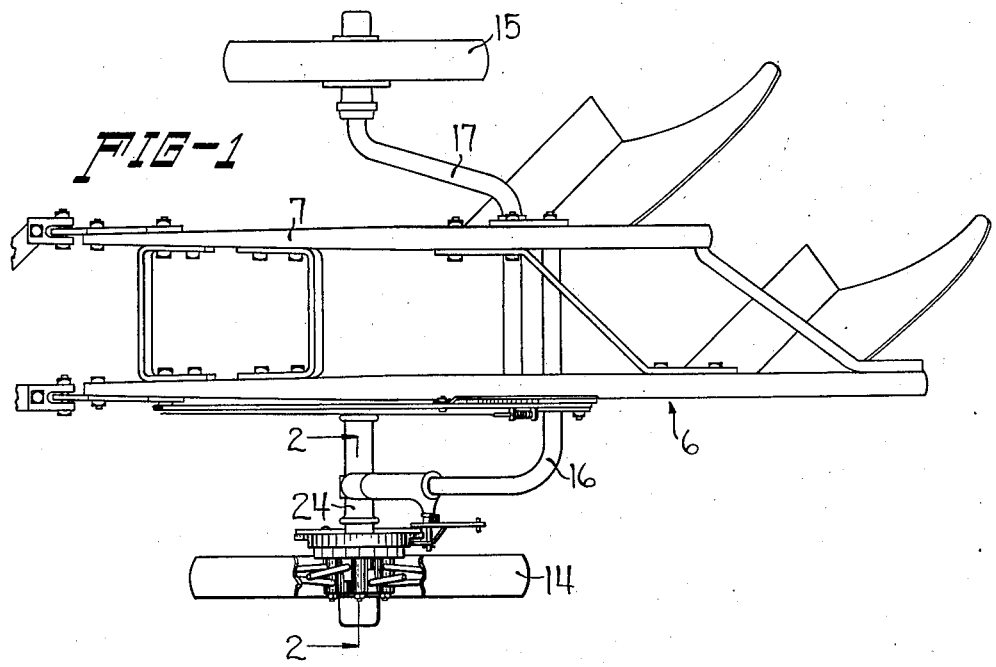
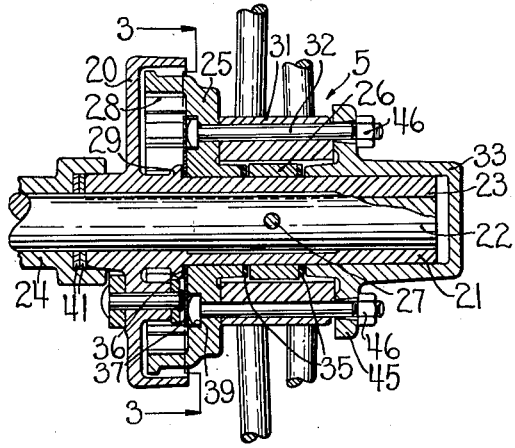
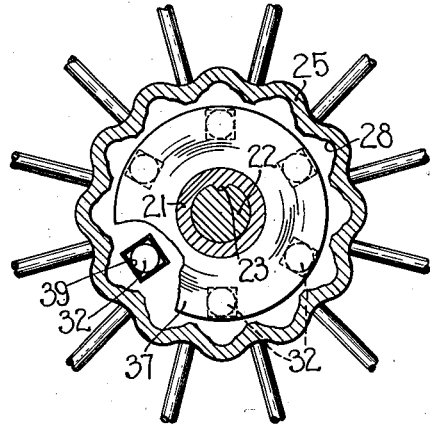
INVENTOR
GEORGE G. SIMPSON.
BY
ATTORNEY Patented Oct. 27, 1936

2,058,640

UNITED STATES PATENT OFFICE 2,058,640

PLOW

George G. Simpson, Moline, Ill., assignor to Deere & Company, Moline, Ill., a corporation of Illinois Application February 19, 1936, Serial No. 64,712

4 Claims. (Cl. 97—73)

The present invention relates to power lift clutch mechanisms such as are commonly used on plows and it pertains particularly to improvements in the construction of the power lift mechanism to facilitate easier assembly of the parts thereof.

The type of clutch mechanism to which this invention pertains comprises a clutch casing and a clutch drum which are held in assembled relation with a wheel and wheel cap, by means of a plurality of long bolts which extend through aligned holes provided in the clutch drum, wheel hub and wheel cap, the heads of the bolts fitting into recesses formed on the inner face of the clutch drum. In assembling these parts the bolts are inserted in the holes provided in the clutch drum before the drum is mounted in the clutch casing, after which the wheel and wheel cap are mounted in place. Some difficulty has been experienced in assembling in that when mounting the wheel and wheel cap in place the bolts are frequently pushed inwardly so that their heads are disengaged from the recesses and the outer or threaded ends are not accessible for applying the nuts thereto.

The principal object of this invention is to provide means for holding the heads of the bolts in their respective recesses in the inner face of the clutch drum, so that they will not become dislodged and be pushed into the clutch casing when the wheel and wheel cap are mounted over the bolts.

Referring to the accompanying drawing illustrating a preferred embodiment of my invention:

Figure 1 is a diagrammatic plan view of a plow, with the power lift clutch mechanism mounted thereon;

Figure 2 is a longitudinal sectional view of the clutch mechanism, taken on the plane of line 2—2 of Figure 1; and Figure 3 is a transverse section of the clutch mechanism taken on the line 3—3 of Figure 2.

The power lift clutch mechanism, referred to in its entirety by numeral 5, is shown as applied to a plow 6 carried on land and furrow wheels 14 and 15 supported on cranked land and furrow axles 16 and 17 disposed at opposite sides of the implement.

The land axle 16 is rotated rearwardly to raise plow 6 out of the ground by means of clutch mechanism 5 which is operatively associated with land wheel 14. The clutch mechanism 5 comprises a clutch casing 20 having a long sleeve 21 projecting outwardly therefrom and keyed to a horizontal spindle 22 by a key 23 formed integral with sleeve 21. The spindle 22 is attached to the cranked end of axle 16 by a casting 24. A clutch drum 25 is journaled on sleeve 21 and is held in operative association with casing 20 by a circular flange 29 on casing 20 and by a collar 26. Collar 26 as well as sleeve 21 are held in a fixed position on spindle 22 by a pin 27 extending through collar 26, sleeve 21 and spindle 22. A plurality of notches 28 which are adapted to receive a clutch roller (not shown) are formed around the inner face of drum 25. For a detailed description of the operation of a clutch of this general type, reference may be had to the Brown Patent 1,610,420, issued December 14, 1926. The drum 25 is secured to the hub 31 of wheel 14 and to axle cap 33 journaled upon and disposed over the outer end of sleeve 21 by means of a plurality of bolts 32 which extend through aligned holes in drum 25, hub 31 and cap 33. The heads of bolts 32 fit into square recesses 39 formed in the inner face of drum 25. The recesses 39 are slightly deeper than the thickness of the bolt heads so that the bolt heads will be disposed below the upper surface of the recesses. A pair of hardened steel washers 35 are provided on sleeve 21 at each side of collar 26 to reduce wear on the faces of collar 26 and the adjacent faces of drum 25 and cap 33. A pair of washers 36 and 37 are also provided between drum 25 and flange 29 to reduce wear of the adjacent faces of these members. The washer 37 is of sufficient diameter to extend over and cover recesses 39. A pair of washers 41 between casing 20 and member 24 serve the same purpose at this point.

In assembling the parts of a clutch mechanism 5, bolts 32 are placed in position in drum 25 with their heads seated in the recesses 39. Next washers 36 and 37 are disposed upon sleeve 21 and then drum 25 is placed in position upon sleeve 21 against washer 37. Following this collar 26 is placed over sleeve 21 after which pin 27 is inserted to lock the clutch parts on the spindle 22. Then wheel 14 is placed in position over bolts 32, and then cap 33, after which the nuts 46 are applied to bolts 32 to clamp the wheel 14 and cap 33 securely in position. These latter operations might be troublesome in causing displacement of the bolts were it not for the fact that washer 37, which extends over recesses 39, prevents their being displaced. It is obvious of course that if desired, the nuts 46 could be disposed in recesses 39 and the bolts 32 inserted through the holes in cap 33 and in hub 31 in the opposite direction. In such case, it would be desirable to increase the depth of the recesses somewhat to also accommodate the end of the bolt extending beyond the nut, and to shape the recess to correspond to the shape of the nut. The washer 37 in this latter case would also facilitate assembly in that it would serve to hold the nuts in place.

What I claim is:

1. A power lift clutch mechanism comprising a clutch casing member and a clutch drum member, means for operatively associating said members for relative axial rotation, and for retaining said members in such position, a washer disposed between said members to reduce the wear on said members incident to relative rotation of such members, a wheel hub, means fixing said hub to one of said members including a plurality of bolts disposed in aligned holes in said one member and in said hub, said one member having recesses around the holes therein on the inner side of said one member to receive the heads of said bolts, said washer being of a diameter sufficient to cover said recesses and hold said bolts in position in said one member to facilitate assembly of the clutch mechanism.

2. A power lift clutch mechanism comprising a clutch casing having an elongated sleeve formed integral therewith and a clutch drum journaled upon said sleeve, means for holding said clutch drum in operative association with said casing comprising a flange on said sleeve on the inner side of said drum and a collar disposed on the other side of said drum and attached to said sleeve, a washer disposed between said drum and said flange to reduce the wear on said flange and said drum incident to relative rotation thereof, a wheel hub embracing said collar, and means fixing said hub to said drum including a plurality of bolts disposed in aligned holes in said drum and said hub, said drum having recesses around the holes therein on the side adjacent said washer receiving the heads of said bolts, said washer being of a diameter sufficient to cover said recesses and hold said bolts in position in said drum to facilitate assembly of the clutch mechanism.

3. A power lift clutch mechanism comprising a clutch casing having an elongated sleeve formed integral therewith and a clutch drum journaled upon said sleeve, means for holding said clutch drum in operative association with said casing comprising a flange on said sleeve on the inner side of said drum and a collar disposed on the other side of said drum and attached to said sleeve, a washer disposed between said drum and said flange to reduce the wear on said flange and said drum incident to relative rotation thereof, a wheel hub embracing said collar and on one side bearing against the outer side of said drum, a cap journaled on said sleeve and bearing against the other side of said hub, means fixing said hub and cap to said drum including a plurality of bolts disposed in aligned holes in said drum, said hub, and said cap, said drum having recesses around the holes therein on its inner side in which the heads of said bolts are disposed, said washer being of a diameter sufficient to cover said recesses and hold said bolts in position to facilitate assembly of the clutch mechanism.

4. In a power lift clutch mechanism, a clutch casing, a clutch drum within said clutch casing, a plurality of wheel attaching bolts mounted in said drum and projecting outwardly therefrom, a wheel supported on said attaching bolts, an axle cap attached to the outer ends of said bolts, a plurality of recesses formed in the inner face of said drum to receive the heads of said attaching bolts, and means for holding said heads in said recesses to facilitate assembly of the clutch mechanism.

GEORGE G. SIMPSON.